US007705092B2

(12) United States Patent  (10) Patent No.: US 7,705,092 B2
Asai et al.  (45) Date of Patent: Apr. 27, 2010

(54) PROCESS FOR PRODUCING VINYL POLYMER

(75) Inventors: Yousuke Asai, Settsu (JP); Nao Fujita, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 11/885,584

(22) PCT Filed: Mar. 3, 2006

(86) PCT No.: PCT/JP2006/304133

§ 371 (c)(1), (2), (4) Date: Mar. 21, 2008

(87) PCT Pub. No.: WO2006/093283

PCT Pub. Date: Sep. 8, 2006

(65) Prior Publication Data

US 2008/0214742 A1 Sep. 4, 2008

(30) Foreign Application Priority Data

Mar. 3, 2005 (JP) .............................. 2005-058446

(51) Int. Cl.
 *C08C 19/04* (2006.01)
(52) U.S. Cl. .................. 525/383; 525/221; 525/222; 525/388; 528/489; 528/483
(58) Field of Classification Search ................ 525/221, 525/222, 383, 388; 528/483, 489
See application file for complete search history.

(56) References Cited

U.S. PATENT DOCUMENTS

| 5,245,007 A * | 9/1993 | Yamamoto et al. .......... 528/483 |
| 6,348,554 B1 * | 2/2002 | Roos et al. .................. 526/319 |
| 6,794,461 B2 * | 9/2004 | Fujita et al. ............... 525/330.4 |
| 6,964,999 B1 | 11/2005 | Nakagawa et al. |

| 2005/0014912 A1 | 1/2005 | Hirota et al. |

FOREIGN PATENT DOCUMENTS

| CA | 2 392 780 A1 | 7/2001 |
| EP | 1 449 855 A1 | 8/2004 |
| JP | 46-34986 B1 | 10/1971 |
| JP | 4634986 A | 10/1971 |
| JP | 51-34980 A | 3/1976 |
| JP | 4-216803 A | 8/1992 |
| JP | 11193307 A | 7/1999 |
| JP | 200072816 A | 3/2000 |
| JP | 2001-233914 * | 8/2001 |
| JP | 2001-233914 A | 8/2001 |
| JP | 200269121 A | 3/2002 |
| JP | 2003-327620 A | 11/2003 |
| JP | 2004-500448 A | 1/2004 |
| JP | 2004149563 A | 5/2004 |
| JP | 200072815 A | 3/2007 |
| WO | 01/40317 A2 | 7/2001 |
| WO | WO 03/033546 A1 | 4/2003 |

OTHER PUBLICATIONS

European Search Report dated, Jun. 5, 2009.

* cited by examiner

*Primary Examiner*—Ling-Siu Choi
(74) *Attorney, Agent, or Firm*—Sughrue Mion, PLLC

(57) ABSTRACT

The present invention has its object to provide a process for producing a vinyl polymer which can provide a vinyl polymer in such form that a polymerization catalyst is effectively removed from that. The present invention relates to a process for producing a vinyl polymer wherein a vinyl polymer at the time of completion of the polymerization is treated with oxygen in the presence of a polar solvent. More preferably, the present invention relates to a process for bringing a polymer added with a polar solvent having a relative dielectric constant at 20° C. of not lower than 10 into contact with mixed gases of oxygen and an inert gas such as nitrogen with an oxygen concentration below the explosion limit oxygen concentration of this solvent as in the state of occurrence as a pure component.

10 Claims, No Drawings

PROCESS FOR PRODUCING VINYL POLYMER

TECHNICAL FIELD

The present invention relates to a process for producing vinyl polymers wherein a vinyl polymer at the time of completion of polymerization is subjected to oxygen treatment in a polar solvent.

BACKGROUND ART

The technique of living polymerization, one of the precision polymerization techniques, enables molecular weight and molecular weight distribution controls, among others, and is utilized in producing various functionalized materials such as terminally functionalized polymers, block polymers and graft polymers. The technique of atom transfer radical polymerization, one of the living polymerization techniques, enables the polymerization of vinyl monomers selected within a wide range under mild conditions and therefore is particularly of high utility value. As an example of atom transfer radical polymerization, there may be mentioned, for example, a polymerization system in which an organic halide or halosulfonyl compound is used as the initiator and a metal complex composed of a VIII, IX, X, or XI group element in the periodic table as a central metal is used as a catalyst (cf. e.g. Patent Document 1 to 4).

The vinyl polymers produced by such methods of polymerization are characterized in that they have a halogen group at one or each polymer terminus.

Halogen group-containing vinyl polymers can be used, for example, as intermediates for the production of various functionalized materials. For example, alkenyl group-containing vinyl polymers can be produced by converting the halogen group to an alkenyl group-containing group. Alkenyl group-containing vinyl polymers, when reacted with a compound containing a plurality of hydrosilyl groups within the molecule, are crosslinked to give cured products. Further, when the alkenyl group is reacted with a reactive silyl group-containing hydrosilane compound, the reactive silyl group can be introduced into the vinyl polymers. In these reactions, the hydrosilylation reaction in which a complex of a metal such as platinum is used as a catalyst is generally utilized. Further, by converting the halogen group to a polymerizable carbon-carbon double bond-containing group, such as a (meth)acryloyl group, it also becomes possible to utilize the resulting vinyl polymers as photoinduced radical-curable or thermally induced radical-polymerizable resins or as macromonomers for grafting onto other polymers.

In this manner, halogen group-containing vinyl polymers are utilizable as intermediates for the production of various functionalized materials, among others. For their being widely useful as intermediates, however, it is necessary to purify the polymers. In the case of such vinyl polymers being intended to be utilized after conversion of the halogen group to an alkenyl group, for instance, the polymerization catalyst or the like remaining in the vinyl polymers acts as a catalyst poison in the hydrosilylation reaction and therefore, it becomes necessary to purify the polymers. The residual polymerization catalyst or the like also has a fundamental problem in that it causes marked discoloration of the vinyl polymers. Further, in cases where the halogen group is converted to a polymerizable carbon-carbon double bond-containing group, for example a (meth)acryloyl group, followed by photoinduced radical curing to give cured products, such discoloration of vinyl polymers influences the curability.

The present inventors have already developed an adsorption treatment method as a method of removing the polymerization catalyst and the like and increasing the hydrosilylation activity (cf. Patent Document 1). Such method makes it possible to efficiently remove the polymerization catalyst and the like to thereby increase the hydrosilylation activity and inhibit the resins from being discolored.

Various methods based on the principle of adsorption treatment are known as methods for efficiently removing polymerization catalysts. According to Patent Document 2, the polymerization catalyst is efficiently removed to a residual metal content level of several hundred ppm by a method comprising the step of heating at a temperature not lower than 50° C. but not higher than 250° C. in the presence of a solid additive at a low solid addition level, followed by solid-liquid separation.

Patent Document 3 describes the effect of treatment with an oxidizing agent such as oxygen in the step of heating. It is stated that the residual metal is removed to a residual level of several hundred ppm to several tens of ppm and the curable hydrosilylation product obtained in the subsequent step is thereby improved in curability. Further, mention is made of the polarity of the solvent to be used in removing the residual metal and, according to it, the relative dielectric constant thereof is desirably not higher than 5; it is described that the effect of eliminating the residual metal by means of a poor solvent exerts an influence on the separability of the residual metal in the subsequent step of separation.

However, even these methods cannot remove the polymerization catalyst completely; hence, only after a plurality of repetitions of the same step, a polymer with a residual metal content causing no problem can be obtained. Those methods which are in common use for separating the polymerization catalyst comprise a solid-liquid separation procedure, such as centrifugation or filtration. Polymer losses are, however, inevitable before and after these separation procedures and, therefore, a plurality of repetitions of the separation step mean decreases in polymer yield. They also have a basic problem in that the increase in the number of steps is unfavorable from the production equipment viewpoint.

On the other hand, it is necessary to subject halogen group-containing vinyl polymers to various molecular terminus conversions so that the functions as functionalized materials may be performed. In preparing functionalized materials capable of being cured in the manner of hydrosilylation reaction, the halogen group is converted to an alkenyl group, and the terminus is then converted to a silyl terminus by the hydrosilylation reaction. In preparing radical-curable types, mention may be made of the method comprising converting the halogen group to a (meth)acryloyl group, for instance. For these terminal conversion reactions, such elementary steps as addition of a functionalizing agent and a solvent, the functionalization reaction, and separation/removal of the excess functionalizing agent are required. In case the desired functional terminus cannot be obtained in one operation, such terminal conversion reaction is repeated a plurality of times.

When these terminal conversion reactions are carried out, there arises a problem; namely, the residual polymerization catalyst in the polymer may inhibit the conversion reactions or, if it does not inhibit the reactions, it may cause discoloration of the polymer. In the case of the hydrosilylation reaction, for instance, it is known that acids, bases and various metals markedly inhibit the reactivity. Known as a method of introducing a (meth) acryloyl group is, for example, the reaction involving the addition of potassium acrylate or potassium methacrylate using N,N-dimethylacetamide as a solvent (cf. Patent Document 4 and 5). This reaction has a problem in that the residual polymerization catalyst in the polymer, if any, causes marked discoloration of the polymer. Further, when the polymer is subjected to warming treatment in the operation for removing the functionalizing agent and solvent, the discoloration of the polymer is further promoted thereby.

Therefore, it can be understood that it is very important, from the quality insurance viewpoint, to remove polymerization catalysts as far as possible prior to carrying out any terminal conversion reaction. The methods of removing polymerization catalysts as described in the above-cited Patent Documents 2 and 3 require a plurality of repetitions of these steps and, in the functional group introduction reaction for introducing a (meth)acryloyl group, in particular, they have a problem in that even very low levels of a polymerization catalyst, if remaining, cause polymer discoloration. Thus, a more efficient method of removing polymerization catalysts has been desired.

Side by side the effect of a solid additive, the effect of oxygen or an oxidizing agent in efficiently removing polymerization catalysts may be mentioned. Patent Document 6 refers to the effect of the addition of an oxidizing agent. Thus, a polymer is diluted with toluene and subjected to various oxidizing agent treatments. In the case of contacting with air, which is easiest to handle and does not need removal of any oxidizing agent, toluene was added in an amount of 9 volumes per volume of polymer and the mixture was stirred at room temperature for 8 hours while it was bubbled with air. The result was such that the residual Cu concentration after treatment was not higher than 10 ppm. Another example characterized by contacting with air at room temperature is seen in Patent Document 7. These documents mention only the possibility of small laboratory size operations and a problem will be encountered in practicing such methods on a commercial scale. Namely, it is a problem from the maintenance of safety viewpoint to bring such a system containing toluene, namely a combustible solvent having a flash point, into contact with air having an oxygen concentration of 21%. Further, these aromatic solvents such as toluene are selected in view of their effect of insolubilizing the polymerization catalyst which is a transition metal complex. For this effect, low-polarity solvents are said to be desirable. These examples refer to the effect of an oxidizing agent or oxygen in the stage after dilution with toluene.

It has been revealed, however, that the effect of an oxidizing agent or oxygen in the presence of a low-polarity solvent such as toluene is insufficient in some instances, as described later herein in a comparative example, among others. It is a further problem that the treatment with oxygen in the presence of such a low-polarity solvent as toluene is insufficient to completely remove polymerization catalysts, which are transition metal complexes; therefore, the subsequent solvent evaporation and functional group introduction procedures are carried out in the presence of residues of the polymerization catalysts, so that the final products are markedly discolored, for instance.

Patent Document 1: Japanese Kokai Publication Hei-11-193307
Patent Document 2: Japanese Kokai Publication 2004-149563
Patent Document 3: Japanese Kokai Publication 2003-327620
Patent Document 4: Japanese Kokai Publication 2000-072815
Patent Document 5: Japanese Kokai Publication 2000-072816
Patent Document 6: Japanese Kokai Publication 2002-69121
Patent Document 7: Japanese Kohyo Publication 2004-500448
Non-Patent Document 1: Matyjaszewski, et al., J. Am. Chem. Soc., 1995, vol. 117, p. 5614
Non-Patent Document 2: Matyjaszewski, et al., Macromolecules, 1995, vol. 28, p. 7901
Non-Patent Document 3: Matyjaszewski, et al., Science, 1996, vol. 272, p. 866
Non-Patent Document 4: Sawamoto, et al., Macromolecules, 1995, vol. 28, p. 1721

SUMMARY OF THE INVENTION

It is an object of the present invention to provide a process for efficiently removing the polymerization catalyst from a vinyl polymer and thereby producing a higher-quality polymer without causing inhibition of the functional group introduction reaction or without causing deteriorations in quality, for example polymer discoloration, in such procedures as functional group introduction reaction and heating procedures.

The present inventors made intensive investigations to find out a process for efficiently removing the polymerization catalyst, which is a transition metal catalyst, from a polymer comprising a vinyl polymer and, as a result, found that the process comprising subjecting the polymer to oxygen treatment in the presence of a polar solvent is a process suited for solving the problems. Based on this and other findings, they have now completed the present invention. It is an advantageous feature of the invention that better-quality polymers can be provided safely by treatment with oxygen-containing gas outside the explosion limits of the solvent without producing such problems as polymer discoloration.

Thus, the present invention relates to
a process for producing vinyl polymers
wherein a vinyl polymer at the time of completion of the polymerization is treated with oxygen in the presence of a polar solvent.

DETAILED DESCRIPTION OF THE INVENTION

In the practice of the invention, the polar solvent preferably has a relative dielectric constant $\epsilon r$ at 20° C. of not lower than 10;

The polarity of the whole of volatile substances coexisting with the vinyl polymer to be submitted to oxygen treatment preferably has a relative dielectric constant at 20° C. of not lower than 10;

Oxygen is introduced preferably in the form of a mixed gas composed of oxygen at a volume percent of not higher than 10% and an inert gas;

The oxygen treatment time is preferably not shorter than 1 hour.

In the practice of the invention, the vinyl polymer is preferably a (meth)acrylic polymer;

The vinyl polymer is preferably a halogen group-containing vinyl polymer;

The vinyl polymer preferably has a number average molecular weight of 500 to 100,000;

The vinyl polymer preferably has a molecular weight distribution of lower than 1.8.

Further, in the practice of the invention, the vinyl polymer is preferably one produced by atom transfer radical polymerization;

The transition metal complex, which serves as the catalyst for the atom transfer radical polymerization, is preferably selected from complexes of copper, nickel, ruthenium or iron;

The transition metal complex is preferably a copper complex.

In the following, the invention is described in detail.

The process for producing vinyl polymers according to the invention is characterized by subjecting a vinyl polymer at the time of completion of the polymerization to oxygen treatment in the presence of a polar solvent.

More specifically, it is a process for removing the transition metal or a like polymerization catalyst from a vinyl polymer (preferably a vinyl polymer produced by utilizing the technique of atom transfer radical polymerization) containing a solvent by subjecting, at the time of completion of the polymerization, the vinyl polymer to oxygen treatment in the presence of a polar solvent.

First, the technique of atom transfer radical polymerization, which can be properly applicable to the production process of the invention, is described.

The atom transfer radical polymerization technique, so referred to herein, is one of living radical polymerization techniques and comprises radical polymerization of a vinyl monomer using an organic halide or halosulfonyl compound as an initiator and a metal complex whose center metal is a transition metal as a catalyst. The atom transfer radical polymerization technique makes it possible to control the molecular weight and molecular weight distribution and, since it also makes it possible to introduce a halogen group into a polymer terminus, it is best suited as a method of producing halogen group-containing vinyl polymers.

Examples of the atom transfer radical polymerization include the processes disclosed in Matyjaszewski, et al., Journal of American Chemical Society (J. Am. Chem. Soc.), 1995, vol. 117, p. 5614; Macromolecules, 1995, vol. 28, p. 7901; Science, 1996, vol. 272, p. 866; WO96/30421; WO97/18247; WO98/01480; WO98/40415; Sawamoto, et al., Macromolecules, 1995, vol. 28, p. 1721; and Japanese Kokai Publication Hei-09-208616; Japanese Kokai Publication Hei-08-41117.

The atom transfer radical polymerization uses, as the initiator, an organic halide, particularly an organic halide having a highly reactive carbon-halogen bond (e.g., a carbonyl compound having a halogen at an α-position, or a compound having a halogen at a benzyl position), a halogenated sulfonyl compound, or the like.

Specific examples of such a compound include the following:

$C_6H_5$—$CH_2X$, $C_6H_5$—$C(H)(X)CH_3$, and $C_6H_5$—$C(X)(CH_3)_2$ (wherein $C_6H_5$ is a phenyl group, X is chlorine, bromine, or iodine);

$R^3$—$C(H)(X)$—$CO_2R^4$, $R^3$—$C(CH_3)(X)$—$CO_2R^4$, $R^3$—$C(H)(X)$—$C(O)R^4$, and
$R^3$—$C(CH_3)(X)$—$C(O)R^4$ (wherein $R^3$ and $R^4$ each is a hydrogen atom or an alkyl group, an aryl group, or an aralkyl group having 1 to 20 carbon atoms;

X is chlorine, bromine, or iodine); and $R^3$—$C_6H_4$—$SO_2X$ (wherein $R^3$ is a hydrogen atom or an alkyl group, an aryl group, or an aralkyl group having 1 to 20 carbon atoms; X is chlorine, bromine, or iodine).

By carrying out the atom transfer radical polymerization of a vinyl monomer using an organic halide or a sulfonyl halide compound as an initiator, it becomes possible to obtain vinyl polymers having a terminal structure represented by the general formula 1:

(wherein $R^1$ and $R^2$ each represents the group bound to the ethylenically unsaturated group in the vinyl monomer, and X represents chlorine, bromine, or iodine.)

As the initiator in the atom transfer radical polymerization, an organic halide or halogenated sulfonyl compound having a functional group, which initiates polymerization, as well as a specified reactive functional group, which does not initiate polymerization, can be used. In this case, the resultant vinyl polymer has the specified reactive functional group at one of the main chain termini and a halogen group-containing structure (1) at the other terminus.

Examples of such a specified reactive functional group include alkenyl, crosslinkable silyl, hydroxyl, epoxy, amino, and amido groups. Utilizing the reactivity of such reactive functional groups, it is possible to introduce another appropriate functional group into the vinyl polymer through one reaction step or a plurality of reaction steps.

Examples of an organic halide having an alkenyl group include, but not limited to, compounds having a structure represented by the general formula 2:

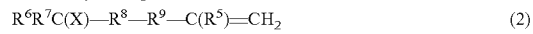

(wherein $R^5$ is a hydrogen atom or a methyl group; $R^6$ and $R^7$ each is a hydrogen atom, a monovalent alkyl group, an aryl group or an aralkyl group having 1 to 20 carbon atoms, or $R^6$ and $R^7$ are bonded together at the other termini; $R^8$ is —C(O)O— (ester group), —C(O)— (keto group), or an o-, m-, or p-phenylene group; $R^9$ is a direct bond or a divalent organic group having 1 to 20 carbon atoms, which may contain at least one ether bond; and X is chlorine, bromine, or iodine).

Specific examples of substituents $R^6$ and $R^7$ include hydrogen, methyl, ethyl, n-propyl, isopropyl, butyl, pentyl, and hexyl groups. Substituents $R^6$ and $R^7$ may be bonded together at the other termini to form a cyclic skeleton.

Specific examples of the organic halide having an alkenyl group represented by the general formula 2 may be the following, for example:

$XCH_2C(O)O(CH_2)_mCH=CH_2$,
$H_3CC(H)(X)C(O)O(CH_2)_nCH=CH_2$,
$(H_3C)_2C(X)C(O)O(CH_2)_mCH=CH_2$,
$CH_3CH_2C(H)(X)C(O)O(CH_2)_nCH=CH_2$, and

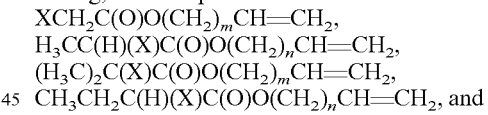

(wherein X is chlorine, bromine, or iodine, and n is an integer of 0 to 20);

$XCH_2C(O)O(CH_2)_nO(CH_2)_mCH=CH_2$,
$H_3CC(H)(X)C(O)O(CH_2)_n$—$O(CH_2)_mCH=CH_2$,
$(H_3C)_2C(X)C(O)O(CH_2)_nO(CH_2)CH=CH_2$,
$CH_3CH_2C(H)(X)C(O)O(CH_2)_n$—$O$—$(CH_2)_mCH=CH_2$, and

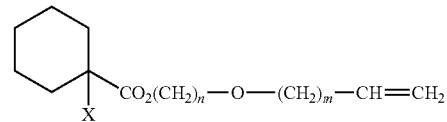

(wherein X is chlorine, bromine, or iodine, n is an integer of 1 to 20, and m is an integer of 0 to 20);

o, m, p-XCH$_2$—C$_6$H$_4$—(CH$_2$)$_n$—CH=CH$_2$,
o, m, p-CH$_3$C(H)(X)—C$_6$H$_4$—(CH$_2$)$_n$—CH=CH$_2$, and
o, m, p-CH$_3$CH$_2$C(H)(X)—C$_6$H$_4$—(CH$_2$)$_n$—CH=CH$_2$ (wherein X is chlorine, bromine, or iodine, and n is an integer of 0 to 20);

o, m, p-XCH$_2$—C$_6$H$_4$—(CH$_2$)$_n$—O—(CH$_2$)$_m$—CH=CH$_2$,
o, m, p-CH$_3$C(H)(X)—C$_6$H$_4$—(CH$_2$)$_n$—O—(CH$_2$)$_m$—CH=CH$_2$, and
o, m, p-CH$_3$CH$_2$C(H)(X)—C$_6$H$_4$—(CH$_2$)$_n$—O—(CH$_2$)$_m$CH=CH$_2$ (wherein X is chlorine, bromine, or iodine, n is an integer of 1 to 20, and m is an integer of 0 to 20);

o, m, p-XCH$_2$—C$_6$H$_4$—O—(CH$_2$)$_n$—CH=CH$_2$,
o, m, p-CH$_3$C(H)(X)—C$_6$H$_4$—O—(CH$_2$)$_n$—CH=CH$_2$, and
o, m, p-CH$_3$CH$_2$C(H)(X)—C$_6$H$_4$—O—(CH$_2$)$_n$—CH=CH$_2$ (wherein X is chlorine, bromine, or iodine, and n is an integer of 0 to 20); and o, m, p-XCH$_2$—C$_6$H$_4$—O—(CH$_2$)$_n$—O—(CH$_2$)$_m$—CH=CH$_2$,
o, m, p-CH$_3$C(H)(X)—C$_6$H$_4$—O—(CH$_2$)$_n$—O—(CH$_2$)$_m$—CH=CH$_2$, and
o, m, p-CH$_3$CH$_2$C(H)(X)—C$_6$H$_4$—O—(CH$_2$)$_n$—O—(CH$_2$)$_m$—CH=CH$_2$ (wherein X is chlorine, bromine, or iodine, n is an integer of 1 to 20, and m is an integer of 0 to 20).

Other examples of the organic halide having an alkenyl group include compounds represented by the general formula 3:

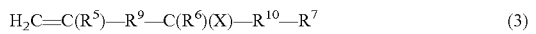

$$H_2C=C(R^5)—R^9—C(R^6)(X)—R^{10}—R^7 \quad (3)$$

(wherein R$^5$, R$^6$, R$^7$, R$^9$, and X represent the same as above, and R$^{10}$ represents a direct bond or —C(O)O— (ester group), —C(O)— (keto group), or an o-, m-, or p-phenylene group).

R$^9$ is a direct bond or a divalent organic group having 1 to 20 carbon atoms (which may contain at least one ether bond). When R$^9$ is a direct bond, the compound is a halogenated allyl compound in which a vinyl group is bonded to the carbon bonded to a halogen. In this case, the carbon-halogen bond is activated by the adjacent vinyl group, and thus a C(O)O or phenylene group is not necessarily required as R$^{10}$, and a direct bond may be present. When R$^9$ is not a direct bond, R$^{10}$ is preferably a C(O)O, C(O), or phenylene group for activating the carbon-halogen bond.

Specific examples of the compounds represented by the general formula 3 include the following:

CH$_2$=CHCH$_2$X, CH$_2$=C(CH$_3$)CH$_2$X, CH$_2$=CHC(H)(X)CH$_3$,
CH$_2$=C(CH$_3$)C(H)(X)CH$_3$, CH$_2$=CHC(X)(CH$_3$)$_2$,
CH$_2$=CHC(H)(X)C$_2$H$_5$,
CH$_2$=CHC(H)(X)CH(CH$_3$)$_2$, CH$_2$=CHC(H)(X)C$_6$H$_5$,
CH$_2$=CHC(H)(X)CH$_2$C$_6$H$_5$,
CH$_2$=CHCH$_2$C(H)(X)—CO$_2$R, CH$_2$=CH(CH$_2$)$_2$C(H)(X)—CO$_2$R,
CH$_2$=CH(CH$_2$)$_3$C(H)(X)—CO$_2$R, CH$_2$=CH(CH$_2$)$_8$C(H)(X)—CO$_2$R,
CH$_2$=CHCH$_2$C(H)(X)—C$_6$H$_5$, CH$_2$=CH(CH$_2$)$_2$C(H)(X)—C$_6$H$_5$, and
CH$_2$=CH(CH$_2$)$_3$C(H)(X)—C$_6$H$_5$ (wherein X is chlorine, bromine, or iodine, and R is an alkyl, aryl, or aralkyl group having 1 to 20 carbon atoms).

Specific examples of the halogenated sulfonyl compound having an alkenyl group include the following:

o-, m-, p-CH$_2$=CH—(CH$_2$)$_n$—C$_6$H$_4$—SO$_2$X, and
o-, m-, p-CH$_2$=CH—(CH$_2$)$_n$—O—C$_6$H$_4$—SO$_2$X (wherein X is chlorine, bromine, or iodine, and n is an integer of 0 to 20).

Specific examples of the organic halide having a crosslinkable silyl group include, but not particularly limited to, compounds having a structure represented by the general formula 4:

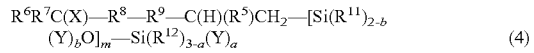

$$R^6R^7C(X)—R^8—R^9—C(H)(R^5)CH_2—[Si(R^{11})_{2-b}(Y)_bO]_m—Si(R^{12})_{3-a}(Y)_a \quad (4)$$

(wherein R$^5$, R$^6$, R$^7$, R$^8$, R$^9$ and X represent the same as above, and R$^{11}$ and R$^{12}$ each is the same or different and each represents an alkyl group, an aryl group, or an aralkyl group having 1 to 20 carbon atoms, or a triorganosiloxy group represented by (R')$_3$SiO— (the three R's each is a monovalent hydrocarbon group having 1 to 20 carbon atoms and may be the same or different); when two or more groups R$^{11}$ or R$^{12}$ are present, they may be the same or different; Y represents a hydroxyl group or a hydrolyzable group, and when two or more groups Y are present, they may be the same or different; a represents 0, 1, 2, or 3; b represents 0, 1, or 2; m is an integer of 0 to 19; and a+mb≧1 is satisfied).

Specific examples of the compounds represented by the general formula 4 include the following:

XCH$_2$C(O)O(CH$_2$)$_n$Si(OCH$_3$)$_3$,
CH$_3$C(H)(X)C(O)O(CH$_2$)$_n$Si(OCH$_3$)$_3$,
(CH$_3$)$_2$C(X)C(O)O(CH$_2$)$_n$Si(OCH$_3$)$_3$,
XCH$_2$C(O)O(CH$_2$)$_n$Si(CH$_3$)(OCH$_3$)$_2$,
CH$_3$C(H)(X)C(O)O(CH$_2$)$_n$Si(CH$_3$)(OCH$_3$)$_2$, and
(CH$_3$)$_2$C(X)C(O)O(CH$_2$)$_n$Si(CH$_3$)(OCH$_3$)$_2$ (wherein X is chlorine, bromine, or iodine, and n is an integer of 0 to 20);

XCH$_2$C(O)O(CH$_2$)$_n$O(CH$_2$)$_m$Si(OCH$_3$)$_3$,
H$_3$CC(H)(X)C(O)O(CH$_2$)$_n$O(CH$_2$)$_m$Si(OCH$_3$)$_3$,
(H$_3$C)$_2$C(X)C(O)O(CH$_2$)$_n$O(CH$_2$)$_m$Si(OCH$_3$)$_3$,
CH$_3$CH$_2$C(H)(X)C(O)O(CH$_2$)$_n$O(CH$_2$)$_m$Si(OCH$_3$)$_3$,
XCH$_2$C(O)O(CH$_2$)$_n$O(CH$_2$)$_m$Si(CH$_3$)(OCH$_3$)$_2$,
H$_3$CC(H)(X)C(O)O(CH$_2$)$_n$O(CH$_2$)$_m$—Si(CH$_3$)(OCH$_3$)$_2$,
(H$_3$C)$_2$C(X)C(O)O(CH$_2$)$_n$O(CH$_2$)$_m$—Si(CH$_3$)(OCH$_3$)$_2$, and
CH$_3$CH$_2$C(H)(X)C(O)O(CH$_2$)$_n$O(CH$_2$)$_m$—Si(CH$_3$)(OCH$_3$)$_2$, (wherein X is chlorine, bromine, or iodine, n is an integer of 1 to 20, and m is an integer of 0 to 20); and o, m, p-XCH$_2$—C$_6$H$_4$—O(CH$_2$)$_2$Si(OCH$_3$)$_3$,
o, m, p-CH$_3$C(H)(X)—C$_6$H$_4$—(CH$_2$)$_2$Si(OCH$_3$)$_3$,
o, m, p-CH$_3$CH$_2$C(H)(X)—C$_6$H$_4$—O(CH$_2$)$_2$Si(OCH$_3$)$_3$,
o, m, p-XCH$_2$—C$_6$H$_4$—(CH$_2$)$_3$Si(OCH$_3$)$_3$,
o, m, p-CH$_3$C(H)(X)—C$_6$H$_4$—(CH$_2$)$_3$Si(OCH$_3$)$_3$,
o, m, p-CH$_3$CH$_2$C(H)(X)—C$_6$H$_4$—(CH$_2$)$_3$Si(OCH$_3$)$_3$,
o, m, p-XCH$_2$—C$_6$H$_4$—(CH$_2$)$_2$—O—(CH$_2$)$_3$Si(OCH$_3$)$_3$,
o, m, p-CH$_3$C(H)(X)—C$_6$H$_4$—(CH$_2$)$_2$—O—(CH$_2$)$_3$Si(OCH$_3$)$_3$,
o, m, p-CH$_3$CH$_2$C(H)(X)—C$_6$H$_4$—(CH$_2$)$_2$—O—(CH$_2$)$_3$Si(OCH$_3$)$_3$,
o, m, p-XCH$_2$—C$_6$H$_4$—O—(CH$_2$)$_3$—Si(OCH$_3$)$_3$,
o, m, p-CH$_3$C(H)(X)—C$_6$H$_4$—O—(CH$_2$)$_3$Si(OCH$_3$)$_3$,
o, m, p-CH$_3$CH$_2$C(H)(X)—C$_6$H$_4$—O—(CH$_2$)$_3$—Si(OCH$_3$)$_3$,
o, m, p-XCH$_2$—C$_6$H$_4$—O—(CH$_2$)$_2$—O—(CH$_2$)$_3$—Si(OCH$_3$)$_3$,
o, m, p-CH$_3$C(H)(X)—C$_6$H$_4$—O—(CH$_2$)$_2$—O—(CH$_2$)$_3$Si(OCH$_3$)$_3$, and
o, m, p-CH$_3$CH$_2$C(H)(X)—C$_6$H$_4$—O—(CH$_2$)$_2$—O—(CH$_2$)$_3$Si(OCH$_3$)$_3$ (wherein X is chlorine, bromine, or iodine).

Other examples of the organic halide having a crosslinkable silyl group include compounds having a structure represented by the general formula 5:

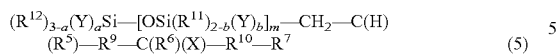  (5)

(wherein $R^5$, $R^7$, $R^8$, $R^9$, $R^{10}$, $R^{11}$, $R^{12}$, a, b, m, X and Y represent the same as above).

Specific examples of such compounds include the following:

$(CH_3O)_3SiCH_2CH_2C(H)(X)C_6H_5$,
$(CH_3O)_2(CH_3)SiCH_2CH_2C(H)(X)C_6H_5$,
$(CH_3O)_3Si(CH_2)_2C(H)(X)$—$CO_2R$,
$(CH_3O)_2(CH_3)Si(CH_2)_2C(H)(X)$—$CO_2R$,
$(CH_3O)_3Si(CH_2)_3C(H)(X)$—$CO_2R$,
$(CH_3O)_2(CH_3)Si(CH_2)_3C(H)(X)$—$CO_2R$,
$(CH_3O)_3Si(CH_2)_4C(H)(X)$—$CO_2R$,
$(CH_3O)_2(CH_3)Si(CH_2)_4C(H)(X)$—$CO_2R$,
$(CH_3O)_3Si(CH_2)_9C(H)(X)$—$CO_2R$,
$(CH_3O)_2(CH_3)Si(CH_2)_9C(H)(X)$—$CO_2R$,
$(CH_3O)_3Si(CH_2)_3C(H)(X)$—$C_6H_5$,
$(CH_3O)_2(CH_3)Si(CH_2)_3C(H)(X)$—$C_6H_5$,
$(CH_3O)_3Si(CH_2)_4C(H)(X)$—$C_6H_5$, and
$(CH_3O)_2(CH_3)Si(CH_2)_4C(H)(X)$—$C_6H_5$ (wherein X is chlorine, bromine, or iodine, and R is an alkyl, aryl, or aralkyl group having 1 to 20 carbon atoms).

Examples of the organic halide or halogenated sulfonyl compound having a hydroxyl group include, but not particularly limited to, the following:

HO—$(CH_2)_n$—OC(O)C(H)(R)(X)

(wherein X is chlorine, bromine, or iodine, R is a hydrogen atom or an alkyl, aryl, or aralkyl group having 1 to 20 carbon atoms, and n is an integer of 1 to 20).

Examples of the organic halide or halogenated sulfonyl compound having an amino group include, but not particularly limited to, the following:

$H_2N$—$(CH_2)_n$—OC(O)C(H)(R)(X)

(wherein X is chlorine, bromine, or iodine, R is a hydrogen atom or an alkyl, aryl, or aralkyl group having 1 to 20 carbon atoms, and n is an integer of 1 to 20).

Examples of the organic halide or halogenated sulfonyl compound having an epoxy group include, but not particularly limited to, the following:

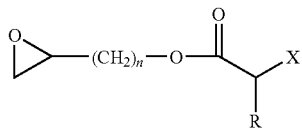

(wherein X is chlorine, bromine, or iodine, R is a hydrogen atom or an alkyl, aryl, or aralkyl group having 1 to 20 carbon atoms, and n is an integer of 1 to 20).

In order to obtain a polymer having at least two halogen groups per molecule, an organic halide or halogenated sulfonyl compound having at least two initiation points is preferably used as the initiator. Examples of such a compound include the following:

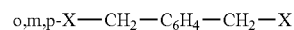

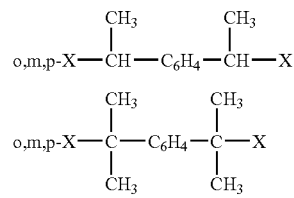

(wherein $C_6H_4$ is a phenylene group, and X is chlorine, bromine, or iodine.)

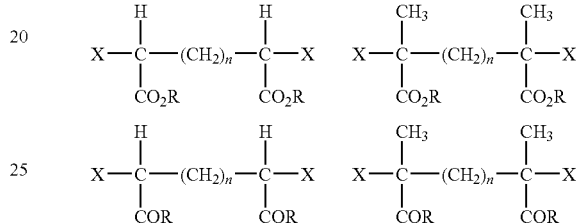

(wherein R is an alkyl, aryl, or aralkyl group having 1 to 20 carbon atoms, n is an integer of 0 to 20, and X is chlorine, bromine, or iodine.)

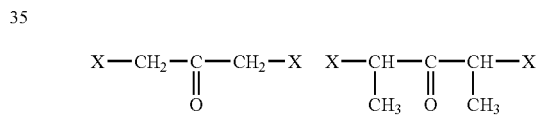

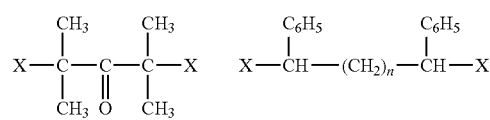

(wherein X is chlorine, bromine, or iodine, and n is an integer of 0 to 20.)

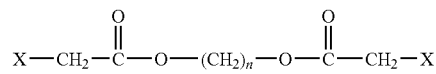

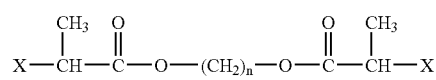

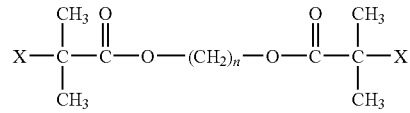

(wherein n is an integer of 1 to 20, and X is chlorine, bromine, or iodine.)

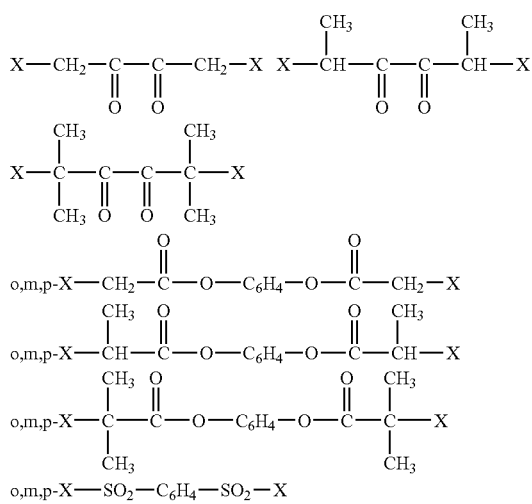

(wherein X is chlorine, bromine, or iodine.)

The transition metal complex used as the polymerization catalyst is not particularly limited, but a metal complex composed of a VII, VIII, IX, X, or XI group element in the periodic table as a central metal is preferred. A complex of zero-valent copper, monovalent copper, divalent ruthenium, divalent iron, or divalent nickel is more preferred. Among these complexes, a copper complex is preferred. Specific examples of the monovalent copper compound include cuprous chloride, cuprous bromide, cuprous iodide, cuprous cyanide, cuprous oxide, and cuprous perchlorate. When the copper compound is used, a ligand, such as 2,2'-bipyridyl or its derivative, 1,10-phenanthroline or its derivative, or polyamine, e.g., tetramethylethylenediamine, pentamethyldiethylenetriamine, or hexamethyl tris(2-aminoethyl) amine, is added for increasing catalyst activity. Also, a tris-triphenylphosphine complex ($RuCl_2$ ($PPh_3)_3$) of divalent ruthenium chloride is suitable as the catalyst. When the ruthenium compound is used as a catalyst, an aluminum alkoxide is added as an activator. Furthermore, a bistriphenylphosphine complex ($FeCl_2(PPh_3)_2$) of divalent iron, a bistriphenylphosphine complex ($NiCl_2(PPh_3)_2$) of divalent nickel, or a bistributylphosphine complex ($NiBr_2(PBu_3)_2$) of divalent nickel is preferred as the catalyst.

The atom transfer polymerization reaction can be performed without a solvent or in any of various solvents. The solvents are not particularly limited, and examples of these include hydrocarbon solvents, such as benzene and toluene; ether solvents, such as diethyl ether, tetrahydrofuran, diphenyl ether, anisole, and dimethoxybenzene; halogenated hydrocarbon solvents, such as methylene chloride, chloroform, and chlorobenzene; ketone solvents, such as acetone, methyl ethyl ketone, and methyl isobutyl ketone; alcohol solvents, such as methanol, ethanol, propanol, isopropanol, n-butyl alcohol, and tert-butyl alcohol; nitrile solvents, such as acetonitrile, propionitrile, and benzonitrile; ester solvents, such as ethyl acetate and butyl acetate; carbonate solvents, such as ethylene carbonate and propylene carbonate; and amide solvents, such as N,N-dimethylformamide and N,N-dimethylacetamide. These solvents can be used alone or as a mixture of two or more. The polymerization can be performed in an emulsion system or a system using a supercritical fluid $CO_2$ as a medium.

The polymerization can be performed in a range of 0° C. to 200° C., and preferably room temperature to 150° C., more preferably 50 to 120° C., without any purpose of restriction.

A vinyl monomer to be used for producing vinyl polymers is not particularly limited and any of various monomers can be used. Examples of the vinyl monomer include (meth) acrylic acid monomers, such as (meth)acrylic acid, methyl (meth)acrylate, ethyl(meth)acrylate, n-propyl(meth)acrylate, isopropyl (meth)acrylate, n-butyl(meth)acrylate, isobutyl (meth)acrylate, tert-butyl(meth)acrylate, n-pentyl (meth) acrylate, n-hexyl(meth)acrylate, cyclohexyl (meth)acrylate, n-heptyl(meth)acrylate, n-octyl (meth)acrylate, 2-ethylhexyl (meth)acrylate, nonyl (meth)acrylate, decyl(meth)acrylate, dodecyl(meth)acrylate, phenyl(meth)acrylate, tolyl(meth) acrylate, benzyl (meth)acrylate, 2-methoxyethyl(meth)acrylate, 3-methoxybutyl(meth)acrylate, 2-hydroxyethyl(meth) acrylate, 2-hydroxypropyl(meth)acrylate, stearyl(meth) acrylate, glycidyl(meth)acrylate, 2-aminoethyl(meth) acrylate, γ-(methacryloyloxypropyl)trimethoxysilane, ethylene oxide adduct of (meth)acrylic acid, trifluoromethylmethyl (meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth) acrylate, perfluoromethyl (meth)acrylate, diperfluoromethylmethyl(meth)acrylate, 2-perfluoromethyl-2-perfluoroethylmethyl(meth)acrylate, 2-perfluorohexylethyl(meth)acrylate, 2-perfluorodecylethyl (meth)acrylate, and 2-perfluorohexadecylethyl (meth)acrylate; styrenic vinyl monomers, such as styrene, vinyltoluene, α-methylstyrene, chlorostyrene, and styrenesulfonic acid and its salts; fluorine-containing vinyl monomers, such as perfluoroethylene, perfluotopropylene, and vinylidene fluoride; silicon-containing vinyl monomers, such as vinyltrimethoxysilane and vinyltriethoxysilane; maleic anhydride, maleic acid, and monoalkyl esters and dialkyl esters of maleic acid; fumaric acid and monoalkyl and dialkyl esters of fumaric acid; maleimide monomers, such as, maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile-containing vinyl monomers, such as acrylonitrile and methacrylonitrile; amido-containing vinyl monomers, such as acrylamide and methacrylamide; vinyl esters, such as vinyl acetate, vinyl propionate, vinyl pivalate, vinyl benzoate, and vinyl cinnamate; alkenes, such as ethylene and propylene; conjugated dienes, such as butadiene and isoprene; and vinyl chloride, vinylidene chloride, allyl chloride, and allyl alcohol. These compounds may be used alone, or at least two may be copolymerized.

In particular, from the viewpoint of physical properties of a product, styrenic monomers and/or (meth) acrylic monomers are preferred. Acrylate monomers and methacrylate monomers are more preferred, acrylate monomers are further preferred. Specifically, particularly preferred is butyl acrylate.

In the present invention, these preferred monomers may be copolymerized, e.g., block-copolymerized, with another monomer. In this case, the content by weight of the preferred monomers is preferably 40% or more. Herein, the term "(meth)acrylic acid" means acrylic acid and/or methacrylic acid.

The vinyl polymer in the practice of the invention includes vinyl polymers and modifications thereof. Those produced by utilizing the atom transfer radical polymerization technique are preferred. As the vinyl polymers, there may be specifically mentioned polymers of those vinyl monomers already enumerated hereinabove, among others. In view of the physical properties of a product, styrenic (co)polymers and (meth) acrylic (co)polymers are preferred; acrylate (co)polymers and methacrylate (co)polymers are more preferred; acrylate (co)polymers are still more preferred; and butyl acrylate (co) polymers are particularly preferred.

The molecular weight of the vinyl polymer is not particularly restricted but the number average molecular weight is preferably not lower than 500 but not higher than 100,000, more preferably not lower than 1,000 but not higher than 100,000, still more preferably not lower than 5,000 but not higher than 50,000.

The molecular weight distribution (weight average molecular weight/number average molecular weight) of the vinyl polymer is not particularly restricted but preferably is lower than 1.8, more preferably not lower than 1.05 but not higher than 1.50, still more preferably not lower than 1.10 but not higher than 1.40.

The molecular weight and molecular weight distribution can be determined on the polystyrene equivalent basis by gel permeation chromatography (GPC) measurements using a polystyrene column and chloroform as a mobile phase.

In carrying out the invention, it is also possible, on the occasion of the synthesis of the vinyl polymer by the above-mentioned atom transfer radical polymerization, to introduce, following the polymerization reaction for forming the main chain of the vinyl polymer, a functional group into the vinyl polymer under the same atom transfer radical polymerization reaction conditions according to the method described in Japanese Kokai Publication 2004-149563 or International Publication WO 01/85804, for instance. Thus, for example, there may be mentioned, among others:

(1) The method comprising copolymerizing a functional group-containing vinyl monomer with a prescribed vinyl monomer under the atom transfer radical polymerization conditions; and (2) The method comprising reacting a functional group-containing olefin compound low in radical polymerizability with a terminal halogen group of a vinyl polymer under the atom transfer radical polymerization conditions.

The functional group is not particularly restricted but includes alkenyl, hydroxyl, silyl, amino, carboxylic acid, carboxylic acid salt and epoxy groups, among others. The functional group-containing olefin compound low in radical polymerizability is not particularly restricted but includes, for example, 1,5-hexadiene, 1,7-octadiene and 1,9-decadiene.

Now, the process for producing vinyl polymers according to the invention is described more specifically.

In that production process, the above-mentioned vinyl monomer, at the time of completion of the polymerization thereof, is subjected to oxygen treatment in the presence of a polar solvent.

The phrase "at the time of completion of the polymerization" is used herein to mean the point of time at which the polymerization reaction is complete and the polymerization catalyst is no more necessary for the reaction (in the case of atom transfer radical polymerization, for instance, the time at which the reaction is complete under the polymerization conditions).

The halogen group-containing vinyl polymer (vinyl polymer resulting from introduction of a functional group) obtained by polymerization in the above manner is preferably purified.

The "purification" so referred to herein is a treatment for removing impurities in the vinyl polymer or a mixture comprising the same out of the system after polymerization (preferably after atom transfer radical polymerization) and may be a treatment of a physical or chemical modification of the vinyl polymer or a mixture comprising the same.

As examples of the purification treatment, there may be mentioned, for example, removal of the residue of the catalyst used in the polymerization, removal or the solvent used in the polymerization, removal of the insoluble matter, for example the polymerization catalyst, treatment by extraction with water, adsorbent treatment or the like, and heating treatment. Chemical modification such as removal of the halogen group etc. or functional group introduction is also one form of such treatment, and removal of the unreacted functional group introducing agent or removal of byproducts formed on the occasion of functional group introduction is also included.

In carrying out the purification treatment, it is preferred from the quality viewpoint that the polymerization catalyst be removed as far as possible in a preceding step. Thus, it is preferred that the polymerization catalyst be removed as far as possible from the point of time at which the polymerization reaction is complete and the polymerization catalyst becomes no more necessary (in the case of atom transfer radical polymerization, the time at which the reaction is complete under the polymerization conditions).

Therefore, in order to remove the polymerization catalyst as far as possible, use is made of the process for producing vinyl polymers according to the invention, namely oxygen treatment in the presence of a polar solvent at the time of completion of polymerization, prior to the above purification treatment.

The polar solvent to be used in the practice of the invention may be one newly added to the polymer, or the solvent used as the polymerization solvent may be used as such.

The polar solvent includes, among others, ketone type solvents such as acetone, acetylacetone, methyl ethyl ketone and methyl isobutyl ketone; alcohol type solvents such as methanol, ethanol, propanol, isopropanol, n-butyl alcohol, tert-butyl alcohol and 1-hexanol; nitrile type solvents such as acetonitrile, propionitrile and benzonitrile; amide type solvents such as formamide, N,N-dimethylformamide and N,N-dimethylacetamide; methyl chloride, 1,2-dichloroethane, acetic acid, nitrobenzene, phenol and so forth. These may be used singly or two or more of them may be used in combination.

The polarity of a solvent is given in terms of SP value (solubility parameter) or relative dielectric constant, for instance. Generally, however, it is expressed in terms of relative dielectric constant. The "relative dielectric constant" is the value ($\epsilon r$) indicating the ratio between the dielectric constant of vacuum and that of the solvent in question. Multiplication of the dielectric constant of vacuum, $\epsilon 0 = 8.8854 \times 10^{-12}$ F/m, by the relative dielectric constant of the solvent gives the dielectric constant of the solvent, $\epsilon 0 \epsilon r$.

The relative dielectric constant of each solvent can be determined by electromagnetic measurements. In the present specification, however, the values described in "Kagaku Binran Kisohen (Handbook of Chemistry: Fundamentals Section)" (Revised 3rd edition, edited by the Chemical Society of Japan, published in Showa 59 (1984) by Maruzen Co., Tokyo) are used.

For those solvents or volatile components for which the relative dielectric constant values are not described in the above handbook, hence are unknown, the relative dielectric constant values measured by the coaxial reflection method can be employed.

From the polymer purity insurance viewpoint, the relative dielectric constant $\epsilon r$ of the polar solvent to be used in the practice of the invention is preferably not lower than 10, more preferably not lower than 20, still more preferably not lower than 30.

The relative dielectric constant of a polar solvent, as so referred to herein, means the relative dielectric constant of the polar solvent in the pure form; it does not refer to the relative dielectric constant of the solvent after use thereof as the polymerization solvent or of the residual monomer mixture or the like.

As preferred polar solvents having a relative dielectric constant or at 20° C. of not lower than 10, there may be mentioned, for example, acetonitrile, acetylacetone, methanol, ethanol, 1-hexanol, formamide, methyl chloride, 1,2-dichloroethane, acetic acid, nitrobenzene and phenol.

The addition amount of the polar solvent is not particularly restricted but, for producing the effect of the polarity of the polar solvent, it is preferably not lower than 1 part by weight, more preferably not lower than 2 parts by weight, still more preferably not lower than 5 parts by weight, per 100 parts by weight of the polymer. The upper limit thereto is not particularly restricted but, considering the removal of the polar solvent in a subsequent step, it is preferably not higher than 100 parts by weight.

The polymerization reaction product to be subjected to the oxygen treatment according to the invention may contain unreacted monomers and the like in addition of the polar solvent in some instances depending on the polymerization reaction. In such instances as well, it is preferred that the polarity, expressed in terms of relative dielectric constant at 20° C., of the whole of volatile substances coexisting with the vinyl polymer to be submitted to oxygen treatment be not lower than 10, more preferably not lower than 15, still more preferably not lower than 20, so that the effect of the polarity of the polar solvent may be produced.

The polarity, namely relative dielectric constant at 20° C., of the whole of volatile substances, so referred to herein, denotes the sum of the respective relative dielectric constants at 20° C. of the volatile substances. The respective relative dielectric constants of the volatile substances each means the value obtained by multiplying the relative dielectric constant of each volatile substance by the volume fraction thereof (the volume of the whole of volatile substances being taken as 100%).

The term "volatile substances" as used herein refers to such substances showing volatility as the volatile substances used in the polymerization reaction (reaction under polymerization reaction conditions), for example the unreacted monomer and the functional group-containing olefin compound low in radical polymerizability, and the polar solvent.

In the practice of the invention, the oxygen treatment is not particularly restricted but is preferably carried out by bringing the polymer obtained into contact with an oxidizing agent such as oxygen.

The oxidizing agent is not particularly restricted in species but an oxygen-containing inert gas, among others, is preferred in view of the advantage that handling thereof is easy and no separation procedure after addition is required.

The inert gas is not particularly restricted but includes nitrogen and helium, among others. The oxygen-containing inert gas is a mixture resulting from causing the above-mentioned inert gas to further contain oxygen.

As for the method of contacting with the oxygen-containing inert gas, there may be mentioned, among others, the method comprising contacting with the oxygen-containing inert gas filling the gaseous phase portion, the method comprising stirring for promoting contact with the oxygen-containing inert gas, the method comprising charging the oxygen-containing inert gas through the liquid phase portion, and the like methods.

As for the method of stirring, there may be mentioned not only the method using a stirring blade but also the utilization of shaking or ultrasonic waves and other various methods. It is also possible to realize contacting and mixing of the gas with the liquid in contact with each other, like in a gas-liquid reaction apparatus. In the case of a gas disperser type apparatus, for instance, there may be mentioned a packed column, a wetted wall column and the like. In the case of a liquid disperser type apparatus, mention may be made of a spray tower, a scrubber and the like. A bubble column, a fluidized bed reactor and the like may also be used. An appropriate one may be selected from among the above-mentioned means, taking into consideration the behavior of the polymer in purification, the efficiency of contact with oxygen and the ease of handling, among others.

The oxygen treatment temperature is not particularly restricted but, from the viewpoint of improvements in efficiency of contacting with oxygen, it is preferably not lower than 20° C., more preferably not lower than 50° C., still more preferably not lower than 80° C. The upper limit is not particularly restricted but preferably not higher than 100° C.

The oxygen treatment is preferably carried out for a period not shorter than a certain period of time so that the effect thereof on the transition metal complex may be fully produced. Although the oxygen treatment time may vary depending on the method of contacting the polymer with the oxygen-containing gas, the contacting time in the simplest case of promoting the contacting of the oxygen-containing gas filling the gaseous phase portion with the polymer in the liquid phase portion by stirring is preferably not shorter than 40 minutes, more preferably not shorter than 1 hour, still more preferably not shorter than 2 hours.

In contacting the solvent-containing polymer with oxygen, it is important for the purpose of assuring safety to restrict the oxygen concentration. The combustibility or explosibility of a solvent showing a flash point or a combustible gas is generally expressed in terms of proportion thereof to air (78% oxygen, 21% nitrogen). The range of explosion of hydrogen, for instance, is 4 to 75% by volume of hydrogen in air and, at mixing concentrations of hydrogen and air outside this concentration range, no explosion or combustion will occur. The explosion range of propane is 2.1 to 9.5% by volume of propane in air. In this manner, the explosion range of a solvent or combustible gas in air is given by a certain concentration range. In cases where the mixing of air and a solvent or combustible gas is not completely uniform, a local deviation from the range of explosion thereof in air may occur and the possibility of explosion or combustion cannot be ignored. In most of the hydrogen explosion-due accident cases frequently encountered in the past, the cause of explosion was the formation of a mixed gas within the explosion limits from air and hydrogen locally remaining in the apparatus in spite of the intended control of the conditions to avoid the range of explosion of hydrogen.

For establishing control to eliminate the unsafety or danger resulting from such operation conditions and apparatus configuration, the concept of explosion limit oxygen concentration is introduced. This provides concentrations of mixed oxygen and nitrogen to indicate a region within which mixed gases of oxygen and nitrogen with an oxygen concentration below the specified level will not cause explosion or combustion irrespective of the concentration of a solvent or combustible gas. With mixed gases composed of oxygen and an inert gas such as nitrogen with an oxygen concentration below the explosion limit oxygen concentration, safety can be secured even if local solvent or combustible gas concentration irregularities, such as mentioned above, occur.

The explosion limit oxygen concentration can be determined by calculation. For example, Yagyu shows a method of determining the explosion limit oxygen concentration from the amount of oxygen required for perfect combustion and the lower explosion limit concentration of a solvent in air (Japan Society for Safety Engineering, Akio Yagyu: Explosion limits of gases and vapors, Japan Society for Safety Engineering, 1963)

According to this, the explosion limit oxygen concentrations of certain solvents are 11 to 12% for toluene, 11 to 12% for acetonitrile, 13 to 14% for butyl acrylate, and 11 to 12% for ethyl acrylate, for instance. Thus, the explosion limit oxygen concentrations for the above-mentioned polar solvents which are to be used in the practice of the invention are in the order of 11%.

In view of these explosion limit oxygen concentration values, oxygen to be introduced in carrying out the oxygen treatment is preferably in the form of a mixed gas composed of oxygen and an inert gas with an oxygen concentration not higher than 10% by volume, more preferably in the form of a mixed gas composed of oxygen and an inert gas with an oxygen concentration not higher than 8% by volume.

However, the oxygen concentration is not restricted to the level given above. It is important to determine the oxygen concentration based on the explosion limit oxygen concentration of the polar solvent employed. Further, for securing a higher level of safety, it is more preferred to employ the value actually measured under the temperature and pressure conditions under which contacting with oxygen is to be actually carried out.

In the case of oxygen treatment of a polymer, the solvent is actually in a state diluted with the polymer and therefore the activity coefficient of the solvent is lower than 1. Thus, the solvent is lower in volatility than in the state of occurrence as a pure component, so that the explosion limit oxygen concentration in a solvent state diluted with the polymer is expected to shift toward the safer side (nonexplosive side)

It is not easy, however, to calculate or determine by experiment the explosion limit oxygen concentration for a solvent in a state diluted with the polymer and, in addition, the explosion limit oxygen concentration varies when various conditions such as the copolymerization composition of the polymer and the residual monomer proportions vary. Therefore, in specifying the explosion limit oxygen concentration for an oxygen-containing mixed gas to be used in treatment herein, the value for the solvent occurring as a pure component is employed, without taking into consideration the fact that the solvent is dissolved in the polymer. Accordingly, the actual system is on the safer side (nonexplosive side).

By carrying out oxygen treatment in the presence of a polar solvent, as mentioned hereinabove, it is possible to improve the separability of the polymerization catalyst from the polymer.

For the separation, such solid-liquid separation procedures as centrifugation and filtration are employed. A sedimentation system or the like utilizing the gravity may also be used.

The polymer, together with the polar solvent added, may be submitted to such a solid-liquid separation procedure. It is desirable, however, to recover the polar solvent by such a procedure as evaporation, followed by further dilution of the polymer with another solvent.

As for the solvent to be used here for redilution, low-polarity solvents (e.g. n-hexane, cyclohexane, methylcyclohexane, ethylcyclohexane, toluene, xylene, butyl acetate, diethyl ether and like hydrocarbon compounds) are desirable used.

Such a pretreatment, prior to solid-liquid separation, as addition of a solid additive (e.g. filter aid such as diatomaceous earth; clay type adsorbent such as synthetic hydrotalcite, aluminum silicate, magnesium oxide, silica gel, silica-alumina, aluminum silicate, activated alumina, acid clay or activated clay; zeolite type adsorbent generally called hydrated aluminosilicate mineral, such as aluminum sodium silicate; inorganic adsorbent such as a dawsonite compound or a hydrotalcite compound) or heating treatment promotes the aggregation of the insolubilized transition metal complex and thus facilitates the solid-liquid separation.

The purification treatment, too, is preferably carried out in an atmosphere of an oxygen-containing inert gas.

When, following the oxygen treatment in the presence of a polar solvent, a purification treatment is carried out which comprises heating in the presence of an antioxidant, followed by solid-liquid separation for removing the metal complex, the polymerization catalyst can be more efficiently removed for polymer purification.

The polymerization catalyst is preferably removed to a level 25 ppm or below, more preferably 15 ppm or below, still more preferably 5 ppm or below, particularly preferably 2 ppm or below.

The vinyl polymer obtained in accordance with the invention can be further subjected to a terminal conversion reaction (functional group introduction reaction). The vinyl polymer obtained after efficient removal of the polymerization catalyst in accordance with the invention has the advantage of allowing functional group introduction with a high probability and further the advantage of being inhibited from discoloration.

The method of functional group introduction is not particularly restricted but may be any of the methods known in the art, including the methods described in Japanese Kokai Publication 2004-149563 and Japanese Kokai Publication 2000-072815, among others. Thus, various functional groups can be introduced into the polymer by the method comprising converting a terminal halogen group of a vinyl polymer using a functional group-containing specific compound; or the method comprising reacting a terminal halogen of a vinyl polymer with a compound represented by the general formula: $M^{+-}OC(O)C(R)=CH_2$ (in which R represents a hydrogen atom or an organic group containing 1 to 20 carbon atoms, $M^+$ represents an alkali metal or a quaternary ammonium ion), for instance.

EFFECT OF THE INVENTION

By carrying out the oxygen, treatment in the presence of a polar solvent in accordance with the present invention, it is possible to effectively separate the polymerization catalyst from the vinyl polymer (preferably vinyl polymer produced by utilizing the technique of atom transfer radical polymerization). In particular, when the polymer with a polar solvent having a relative dielectric constant not lower than a certain specific level as added to the polymer is brought into contact with a mixed gas composed of oxygen and an inert gas such as nitrogen with an oxygen concentration not higher than the explosion limit oxygen concentration for that solvent in pure state, the transition metal complex can be separated safely and efficiently. Thus, the polymer can be obtained as a better-quality one.

BEST MODES FOR CARRYING OUT THE INVENTION

The following examples illustrate the present invention more specifically. These examples are, however, by no means limitative of the scope of the invention. Various modifications can be made within the spirit and scope of the present invention.

In the following examples and comparative examples, "part(s)" means "part(s) by weight".

The oxygen concentration in each oxygen-nitrogen mixed gas is on the volume basis.

In the following examples, the "number average molecular weight" and "molecular weight distribution (ratio of weight average molecular weight to number average molecular weight)" were calculated by the standard polystyrene equivalent method using gel permeation chromatography (GPC). The GPC column used was a crosslinked polystyrene gel-packed one (Shodex GPC K-804; product of Showa Denko K.K.) and the GPC solvent used was chloroform.

The number of bromine groups per polymer molecule was calculated from the data obtained by carrying out a concentration analysis by $^1$H-NMR and from the number average molecular weight determined by GPC.

The residual solvent concentration in each polymer was calculated based on the data from gas chromatography.

As for the "Cu concentration", the polymer was treated with an acid at an elevated temperature, the metal fraction was then extracted with water and the Cu concentration in the polymer was calculated based on the data from ICP-AES (inductively coupled plasma-atomic emission spectroscopy).

COMPARATIVE EXAMPLE 1

Polymerization of N-Butyl Acrylate

Using a total charge of 100 parts of n-butyl acrylate, a polymer was synthesized according to the following formulation. A reaction vessel equipped with a stirrer was charged with CuBr (0.84 part) and acetonitrile (8.79 parts), and the contents were stirred in a nitrogen atmosphere at 65° C. for 15 minutes. Thereto were added n-butyl acrylate (20.0 parts) and ethyl 2-bromobutyrate (1.90 parts), and the whole was thoroughly stirred for mixing up. Pentamethyldiethylenetriamine (0.034 part; hereinafter also referred to as "triamine" for short) was to initiate the polymerization. While heating at 70° C. with stirring, n-butyl acrylate (80.0 parts) was added dropwise continuously. During the dropping of the monomer, triamine (0.102 part) was added in divided portions. After the time of arrival of the monomer conversion at 95% or above, the residual monomer and acetonitrile were removed by evaporation at 80° C. to give a bromine group-terminated polymer. The acetonitrile content in the polymer was determined by gas chromatography analysis and found to be not higher than 1,000 ppm. Analysis of the polymer obtained revealed that the number average molecular weight of the polymer was 11,600 and the weight average molecular weight distribution was 1.1. The number of bromine groups per polymer molecule was not smaller than 0.8.

(Polymer Purification)

A 100-part portion of the polymer obtained was diluted with 100 parts of methylcyclohexane and treated on a centrifuge at 11,900 rpm (9000 G or higher) for a residence time of 2 minutes, whereupon the dilution showed a deep green color. Therefore, 1.0 part of a filter aid (Radiolite #900, product of Showa Chemical Industry Co., Ltd.) was added to the dilution, and the resulting mixture was heated at 80° C. for 2 hours. The polymer solution obtained was further diluted by adding 200 parts of methylcyclohexane and, after addition of a filter aid (Radiolite #300, product of Showa Chemical Industry Co., Ltd.), filtered. Upon concentration of the polymer obtained, the concentrate had a green appearance, and the residual Cu concentration was 40 ppm.

Even after two ways of solid-liquid separation, namely ultracentrifugation treatment at 9000 G or above and filtration, the residual Cu concentration was 40 ppm, and the amount of the solvent used was three times amount of the polymer on the weight basis; thus, the productivity was very poor.

EXAMPLE 1

Polymerization of n-butyl Acrylate

Using a total charge of 100 parts of n-butyl acrylate, a polymer was synthesized according to the following formulation. A reaction vessel equipped with a stirrer was charged with CuBr (0.42 part) and acetonitrile (8.79 parts), and the contents were stirred in a nitrogen atmosphere at 65° C. for 15 minutes. Thereto were added n-butyl acrylate (20.0 parts) and ethyl 2-bromobutyrate (1.90 parts), and the whole was thoroughly stirred for mixing up. Pentamethyldiethylenetriamine (0.034 part; hereinafter also referred to as "triamine" for short) was to initiate the polymerization. While heating at 70° C. with stirring, n-butyl acrylate (80.0 parts) was added dropwise continuously. During the dropping of the monomer, triamine (0.119 part) was added in divided portions. After the time of arrival of the monomer conversion at 95% or above, the polymer was kept in contact with an oxygen-nitrogen mixed gas with an oxygen concentration of 6% for 40 minutes to terminate the polymerization activity. The termination of polymerization activity was confirmed by the monomer conversion having stopped increasing. The residual monomer and acetonitrile were removed by evaporation at 80° C. to give a bromine group-terminated polymer. The acetonitrile content in the polymer was determined by gas chromatography analysis and found to be not higher than 1,000 ppm. Analysis of the polymer obtained revealed that the number average molecular weight of the polymer was 11,600 and the weight average molecular weight distribution was 1.1. The number of bromine groups per polymer molecule was not smaller than 0.8.

The polarity of the whole of volatile substances in the mixture system at the time of arrival of the monomer conversion at 95% is shown in Table 1. In Table 1, the relative dielectric constant of acetonitrile is the value descried in "KagakuBinran Kisohen (Handbook of Chemistry: Fundamentals Section)" (Revised 3rd edition, edited by the Chemical Society of Japan, published in Showa 59 (1984) by Maruzen Co., Tokyo). For acrylate esters such as n-butyl acrylate, no data are available concerning the relative dielectric constant or conductivity. Since, however, they are identical in structure to similar ester type hydrocarbons (3.06 for dibutyl ether), they estimably have a relative dielectric constant of about 2 to 4. Therefore, on the supposition that n-butyl acrylate is lower in polarity as compared with such an estimated value, the relative dielectric constant thereof was considered to be 1.0. Then, considering the amount of the monomer remaining at the time of 95% monomer conversion, the relative dielectric constant of each component in the mixture system was calculated by multiplying the relative dielectric constant of that component by the volume fraction thereof, and the polarity of the whole of volatile substances in the mixture system was calculated as the sum of the relative dielectric constants of the respective components; the thus-calculated relative dielectric constant was 25.3. This indicates that the polarity of the high-polarity solvent will not be reduced as a result of dilution with the low-polarity monomer existing in the system. In Tables 2 and 3 given later herein, too, the polarity of the whole of volatile substances in each of two mixture systems was calculated in the same manner.

TABLE 1

|  | Residual amount(g) | Density | Volume(mL) | Relative dielectric constant | Mixture system |
|---|---|---|---|---|---|
| n-Butyl acrylate | 50 | 0.894 | 55.93 | 1.0 | 0.3 |
| Acetonitrile | 87.91946 | 0.786 | 111.86 | 37.5 | 25.0 |
| Total |  |  | 167.79 |  | 25.3 |

(Polymer Purification)

A 100-part portion of the polymer obtained was diluted with 100 parts of toluene, 1.0 part of a filter aid (Radiolite #900, product of Showa Chemical Industry) was added, and the whole mixture was heated at 80° C. for 2 hours. At hourly intervals during the 2-hour period, an oxygen-nitrogen mixed gas with an oxygen concentration of 6% was applied at a volume ratio of 0.5 to the toluene solution of the polymer. After 2 hours of stirring, the filter aid added was removed. The mixed liquid composed of the polymer and toluene after removal of the filter aid and adsorbent had a light yellowish green color. To the toluene solution of the polymer were added two adsorbents (Kyowaad 500SH and Kyowaad 700SL, each product of Kyowa Chemical Industry Co., Ltd.) each in an amount of 1.0 part, and the resulting mixture was heated to 100° C. and stirred for 2 hours. The same oxygen-nitrogen mixed gas was applied in the same manner as in the first operation. The polymer-toluene mixture after removal of the filter aid and adsorbents was almost colorless and transparent, and the residual Cu concentration was 2 ppm.

In this way, the purification behavior of the polymerization catalyst was improved by carrying out the oxygen treatment in the presence of a polar solvent after polymerization in advance, and the polymer could be recovered with a residual Cu concentration of not higher than 2 ppm by purification treatment of the polymer with 100 parts of the solvent. While toluene was used as the solvent for purification in this example, the relative dielectric constant of methylcyclohexane is 2.02 and that of toluene is 2.24 and, thus, methylcyclohexane is lower in polarity than toluene. As for the purification by removal of Cu, higher levels of purification can be attained with solvents lower in polarity, as described in Japanese Kokai Publication 2003-327620, and the like.

Thus, in spite of the fact that the solvent used for purification in Example 1 was not lower in polarity as compared with the solvent used in Comparative Example 1, the extent of purification by removal of Cu was higher in Example 1. It is thus evident that the oxygen treatment in the presence of a polar solvent immediately after completion of polymerization was effective.

EXAMPLE 2

Copolymerization of n-butyl Acrylate, Ethyl Acrylate and 2-methoxyethyl Acrylate Using a total charge of 100 parts of n-butyl acrylate, ethyl acrylate and 2-methoxyethyl acrylate, a polymer was synthesized according to the following formulation. A reaction vessel equipped with a stirrer was charged with CuBr (0.46 part) and acetonitrile (8.34 parts), and the contents were stirred in a nitrogen atmosphere at 65° C. for 15 minutes. Thereto were added n-butyl acrylate (5.53 parts), ethyl acrylate (7.95 parts), 2-methoxyethyl acrylate (6.52 parts), and diethyl 2,5-dibromoadipate (1.94 parts), and the whole was thoroughly stirred for mixing up. Pentamethyldiethylenetriamine (0.04 part; hereinafter also referred to as "triamine" for short) was to initiate the polymerization. While heating at 70° C. with stirring, n-butyl acrylate (22.13 parts), ethyl acrylate (31.81 parts), 2-methoxyethyl acrylate (26.06 parts) were added dropwise continuously. During the dropping of the monomer, triamine (0.131 part) was added in divided portions. After the time of arrival of the monomer conversion at 96% or above, the polymer was kept in contact with an oxygen-nitrogen mixed gas with an oxygen concentration of 6% for 15 minutes to terminate the polymerization activity. The termination of polymerization activity was confirmed by the monomer conversion having stopped increasing. The residual monomer and acetonitrile were removed by evaporation at 80° C. to give a bromine group-terminated polymer. The acetonitrile content in the polymer was determined by gas chromatography analysis and found to be not higher than 1,000 ppm. Analysis of the polymer obtained revealed that the number average molecular weight of the polymer was 20,200 and the weight average molecular weight distribution was 1.1. The number of bromine groups per polymer molecule was not smaller than 1.6.

The polarity of the whole of volatile substances at the time of arrival of the monomer conversion at 96% is shown in Table 2, and was such that the relative dielectric constant was 25.3.

TABLE 2

|  | Residual amount(g) | Density | Volume(mL) | Relative dielectric constant | Mixture system |
|---|---|---|---|---|---|
| n-Butyl acrylate | 11.064648 | 0.894 | 12.38 | 1.0 | 0.1 |
| Ethyl acrylate | 15.902836 | 0.924 | 17.21 | 1.0 | 0.1 |
| 2-methoxyethyl acrylate | 13.032516 | 1.012 | 12.88 | 1.0 | 0.1 |
| Acetonitrile | 83.4452 | 0.786 | 106.16 | 37.5 | 25.0 |
| Total |  |  | 148.63 |  | 25.3 |

(Polymer Purification)

A 100-part portion of the polymer obtained was diluted with 150 parts of toluene, 0.5 part of a filter aid (Radiolite #900, product of Showa Chemical Industry), and two adsorbents (Kyowaad 500SH and Kyowaad 700SEN, each product of Kyowa Chemical Industry Co., Ltd.) each in an amount of 2.0 parts were added, and the whole mixture was heated at 100° C. for 3 hours. At hourly intervals during the 3-hour period, an oxygen-nitrogen mixed gas with an oxygen concentration of 6% was applied at a volume ratio of 0.5 to the toluene solution of the polymer. After 3 hours of stirring, the filter aid and adsorbents added was removed. The mixed liquid composed of the polymer and toluene after removal of the filter aid and adsorbents had a deep brown color and the residual Cu concentration was 200 ppm. To the toluene solution of the polymer were added 0.5 part of a filter aid (Radiolite #900, product of Showa Chemical Industry), and two adsorbents (Kyowaad 500SH and Kyowaad 700SEN, each product of Kyowa Chemical Industry Co., Ltd.) each in an amount of 2.0 parts, and the resulting mixture was heated to 100° C. and stirred for 3 hours. The same oxygen-nitrogen mixed gas was applied in the same manner as in the first operation. The polymer-toluene mixture after removal of the filter aid and adsorbents had a brown color, and the residual Cu concentration was 49 ppm. Then, the procedure of adding a filter aid and an adsorbent(s) and then stirring at 100° C. was repeated again. The conditions were the same as in the first and second procedures. The polymer-toluene mixture after removal of the filter aid and adsorbents was almost transparent, and the residual Cu concentration was 3 ppm.

While the purification treatment was carried out in the presence of the toluene solvent, the treatment was carried out three times to obtain a polymer-toluene mixed solution having a good appearance. In the oxygen treatment in the presence of a polar solvent, it is preferred that the treatment time be prolonged to some extent.

EXAMPLE 3

Copolymerization of n-butyl Acrylate, Ethyl Acrylate and 2-methoxyethyl Acrylate)

Using a total charge of 100 parts of n-butyl acrylate, ethyl acrylate and 2-methoxyethyl acrylate, a polymer was synthesized according to the following formulation. A reaction vessel equipped with a stirrer was charged with CuBr (0.46 part) and acetonitrile (8.34 parts), and the contents were stirred in a nitrogen atmosphere at 65° C. for 15 minutes. Thereto were added n-butyl acrylate (5.53 parts), ethyl acrylate (7.95 parts), 2-methoxyethyl acrylate (6.52 parts), and diethyl 2,5-dibromoadipate (1.94 parts), and the whole was thoroughly stirred for mixing up. Pentamethyldiethylenetriamine (0.04 part; hereinafter also referred to as "triamine" for short) was to initiate the polymerization. While heating at 70° C. with stirring, n-butyl acrylate (22.13 parts), ethyl acrylate (31.81 parts), 2-methoxyethyl acrylate (26.06 parts) were added dropwise continuously. During the dropping of the monomer, triamine (0.150 part) was added in divided portions. After the time of arrival of the monomer conversion at 95% or above, the polymer was kept in contact with an oxygen-nitrogen mixed gas with an oxygen concentration of 6% for 2 hours. The termination of polymerization activity was confirmed by the monomer conversion having stopped increasing. The residual monomer and acetonitrile were removed by evaporation at 80° C. to give a bromine group-terminated polymer. The acetonitrile content in the polymer was determined by gas chromatography analysis and found to be not higher than 1,000 ppm. Analysis of the polymer obtained revealed that the number average molecular weight of the polymer was 23,900 and the weight average molecular weight distribution was 1.1. The number of bromine groups per polymer molecule was not smaller than 1.6.

The polarity of the whole of volatile substances at the time of arrival of the monomer conversion at 95% is shown in Table 3, and was such that the relative dielectric constant was 25.3

TABLE 3

| | Residual amount(g) | Density | Volume(mL) | Relative dielectric constant | Mixture system |
|---|---|---|---|---|---|
| n-Butyl acrylate | 13.83081 | 0.894 | 15.47 | 1.0 | 0.1 |
| Ethyl acrylate | 19.878545 | 0.924 | 21.51 | 1.0 | 0.1 |
| 2-methoxyethyl acrylate | 16.290645 | 1.012 | 16.10 | 1.0 | 0.1 |
| Acetonitrile | 83.4452 | 0.786 | 106.16 | 37.5 | 25.0 |
| Total | | | 159.24 | | 25.3 |

(Polymer Purification)

A 100-part portion of the polymer obtained was diluted with 150 parts of toluene, 0.5 part of a filter aid (Radiolite #900, product of Showa Chemical Industry), and two adsorbents (Kyowaad 500SH and Kyowaad 700SEN, each product of Kyowa Chemical Industry Co., Ltd.) each in an amount of 1.5 parts were added, and the whole mixture was heated at 100° C. for 3 hours. At hourly intervals during the 3-hour period, an oxygen-nitrogen mixed gas with an oxygen concentration of 6% was applied at a volume ratio of 0.5 to the toluene solution of the polymer. After 3 hours of stirring, the filter aid and adsorbents added was removed. The mixed liquid composed of the polymer and toluene after removal of the filter aid and adsorbents had a light yellowish green color and the residual Cu concentration was 52 ppm. To the toluene solution of the polymer were added 0.5 part of a filter aid (Radiolite #900, product of Showa Chemical Industry), and two adsorbents (Kyowaad 500SH and Kyowaad 700SEN, each product of Kyowa Chemical Industry Co., Ltd.) each in an amount of 1.5 parts, and the resulting mixture was heated to 100° C. and stirred for 3 hours. The same oxygen-nitrogen mixed gas was applied in the same manner as in the first operation. The polymer-toluene mixture after removal of the filter aid and adsorbents was almost transparent, and the residual Cu concentration was 13 ppm.

EXAMPLE 4

Addition of Acetonitrile

In a tightly closed vessel, 100 parts of the polymer obtained in Example 2 (after removal of the residual monomer and acetonitrile by evaporation) and 8.54 parts of acetonitrile were mixed up. The polymer-acetonitrile mixed solution was warmed to 80° C. and allowed to contact with an oxygen-nitrogen mixed gas with an oxygen concentration of 6% for 5 hours.

Since this polymer contained no residual monomer, the polarity of the whole of volatile substances was equal to the relative dielectric constant of acetonitrile, namely 37.5.

(Polymer Purification)

A 100-part portion of the polymer obtained was diluted with 150 parts of toluene, 0.5 part of a filter aid (Radiolite #900, product of Showa Chemical Industry), and two adsorbents (Kyowaad 500SH and Kyowaad 700SEN, each product of Kyowa Chemical Industry Co., Ltd.) each in an amount of 1.5 parts were added, and the whole mixture was heated at 100° C. for 2 hours. At hourly intervals during the 2-hour period, an oxygen-nitrogen mixed gas with an oxygen concentration of 6% was applied at a volume ratio of 0.5 to the toluene solution of the polymer. After 2 hours of stirring, the filter aid and adsorbents added was removed. The mixed liquid composed of the polymer and toluene after removal of the filter aid and adsorbents had a light yellow color and the residual Cu concentration was 45 ppm.

Thus, as a result of the oxygen treatment, in the presence of acetonitrile, of the same polymer as used in Example 2, the purification procedure could be simplified and the residual Cu concentration after purification was at a reduced level.

EXAMPLE 5

Copolymerization of n-butyl Acrylate, Ethyl Acrylate and 2-methoxyethyl Acrylate Using a total charge of 100 parts of n-butyl acrylate, ethyl acrylate and 2-methoxyethyl acrylate, a polymer was synthesized according to the following formulation. A reaction vessel equipped with a stirrer was charged with CuBr (0.46 part) and acetonitrile (8.34 parts), and the contents were stirred in a nitrogen atmosphere at 65° C. for 15 minutes. Thereto were added n-butyl acrylate (5.53 parts), ethyl acrylate (7.95 parts), 2-methoxyethyl acrylate (6.52 parts), and diethyl 2,5-dibromoadipate (1.94 parts), and the whole was thoroughly stirred for mixing up. Pentamethyldiethylenetriamine (0.04 part; hereinafter also referred to as "triamine" for short) was to initiate the polymerization. While heating at 70° C. with stirring, n-butyl acrylate (22.13 parts), ethyl acrylate (31.81 parts), 2-methoxyethyl acrylate (26.06 parts) were added dropwise continuously. During the dropping of the monomer, triamine (0.150 part) was added in divided portions. After the time of arrival of the monomer conversion at 96% or above, the polymer was kept in contact with an oxygen-nitrogen mixed gas with an oxygen concentration of 6% for 2 hours. The termination of polymerization activity was confirmed by the monomer conversion having stopped increasing. The residual monomer and acetonitrile were removed by evaporation at 80° C. to give a bromine group-terminated polymer. The acetonitrile content in the polymer was determined by gas chromatography analysis and found to be not higher than 1,000 ppm. Analysis of the polymer obtained revealed that the number average molecular weight of the polymer was 22,400 and the weight average molecular weight distribution was 1.1. The number of bromine groups per polymer molecule was not smaller than 1.6.

The polarity of the whole of volatile substances at the time of arrival of the monomer conversion at 96% is the same as shown in Table 3, and was such that the relative dielectric constant was 25.3

(Polymer Purification)

A 100-part portion of the polymer obtained was diluted with 150 parts of toluene, 0.5 part of a filter aid (Radiolite #900, product of Showa Chemical Industry), and two adsorbents (Kyowaad 500SH and Kyowaad 700SEN, each product of Kyowa Chemical Industry Co., Ltd.) each in an amount of 1.5 parts were added, and the whole mixture was heated at 80° C. for 15 minutes.

After 15 minutes of stirring, the filter aid and adsorbents added was removed. The mixed liquid composed of the polymer and toluene after removal of the filter aid and adsorbents had a light yellow color and the residual Cu concentration was 24 ppm.

COMPARATIVE EXAMPLE 2

Polymerization of n-butyl Acrylate

Using a total charge of 100 parts of n-butyl acrylate, a polymer was synthesized according to the following formulation. A reaction vessel equipped with a stirrer was charged with CuBr (0.84 part) and acetonitrile (8.79 parts), and the contents were stirred in a nitrogen atmosphere at 65° C. for 15 minutes. Thereto were added n-butyl acrylate (20.0 parts) and ethyl 2-bromobutyrate (1.90 parts), and the whole was thoroughly stirred for mixing up. Pentamethyldiethylenetriamine (0.034 part; hereinafter also referred to as "triamine" for short) was to initiate the polymerization. While heating at 70° C. with stirring, n-butyl acrylate (80.0 parts) was added dropwise continuously. During the dropping of the monomer, triamine (0.102 part) was added in divided portions. After the time of arrival of the monomer conversion at 95% or above, the residual monomer and acetonitrile were removed by evaporation at 80° C. to give a bromine group-terminated polymer. The acetonitrile content in the polymer was determined by gas chromatography analysis and found to be not higher than 1,000 ppm.

The acetonitrile was recovered by evaporation from the polymer obtained, 35.2 parts of acetonitrile was again added, together with 21.4 parts of 1,7-octadiene, further 0.34 part of triamine was added, and the whole mixture was stirred with heating at 80° C. After 6 hours, the acetonitrile and unreacted 1,7-octadiene were recovered by evaporation to give an alkenyl-terminated polymer. The contents of acetonitrile and 1,7-octadiene in the polymer obtained were determined by gas chromatography. The total residual content of acetonitrile and 1,7-octadiene in the polymer was not higher than 1,000 ppm. Analysis of the polymer obtained revealed that the number average molecular weight of the polymer was 25,500 and the weight average molecular weight distribution was 1.3. The number of alkenyl groups per polymer molecule was not smaller than 2.05.

(Polymer Purification)

A 100-part portion of the polymer obtained was diluted with 100 parts of butyl acetate, two adsorbents (Kyowaad 500SH and Kyowaad 700 SL, each product of Kyowa Chemical Industry) were added each in an amount of 0.5 part, 1.0 part of a filter aid (Radiolite #900, product of Showa Chemical Industry) was added, and the whole mixture was warmed at 100° C. for 3 hours. On that occasion, the oxygen concentration in the gaseous phase portion was adjusted to 6% by means of an oxygen-nitrogen mixed gas. The mixture after warming treatment was filtered, and the clear liquid obtained was heated under reduced pressure to recover the butyl acetate by evaporation. After completion of the evaporation, the butyl acetate concentration in the polymer was 2,000 ppm. The residual Cu concentration in the polymer was 430 ppm.

EXAMPLE 6

Polymerization of n-butyl Acrylate

The alkenyl-terminated polymer-containing mixture just before recovery of the acetonitrile and unreacted 1,7-octadiene by evaporation as obtained in Comparative Example 2 was recovered in a nitrogen atmosphere. The mixture recovered was stirred in a reaction vessel with warming at 80° C. for 2 hours while the oxygen concentration in the gaseous phase portion in the vessel was adjusted to 6%. After that, the acetonitrile and unreacted 1,7-octadiene were recovered by evaporation to give an alkenyl-terminated polymer. The contents of acetonitrile and 1,7-octadiene in the polymer obtained were determined by gas chromatography. The total residual content of acetonitrile and 1,7-octadiene in the polymer was not higher than 1,000 ppm. Analysis of the polymer obtained revealed that the number average molecular weight of the polymer was 25,500 and the weight average molecular weight distribution was 1.3. The number of alkenyl groups per polymer molecule was not smaller than 2.05. The polarity of the whole of volatile substances (mixture of acetonitrile and 1,7-octadiene) in the mixture system on the occasion of oxygen treatment (2 hours of heating at 80° C. at an oxygen concentration of 6%) was 24.2, as shown in Table 4.

The relative dielectric constant of 1,7-octadiene as shown herein is the value measured by using the coaxial reflection method, and the sum of the relative dielectric constants of the respective volatile substances in the mixture system was calculated by multiplying each relative dielectric constant value by each volume fraction in the same manner as in Example 1.

TABLE 4

| | Residual amount(g) | Density | Volume(mL) | Relative dielectric constant | Mixture system |
|---|---|---|---|---|---|
| Acetonitrile | 351.678 | 0.786 | 447.43 | 37.5 | 22.6 |
| 1,7-octadiene | 214.945 | 0.73 | 294.45 | 4.04 | 1.6 |
| Total | | | 741.87 | | 24.2 |

(Polymer Purification)

A 100-part portion of the polymer obtained was diluted with 100 parts of butyl acetate, two adsorbents (Kyowaad 500SH and Kyowaad 700 SL, each product of Kyowa Chemical Industry) were added each in an amount of 0.5 part, 1.0 part of a filter aid (Radiolite #900, product of Showa Chemical Industry) was added, and the whole mixture was warmed at 100° C. for 3 hours. On that occasion, the oxygen concentration in the gaseous phase portion was adjusted to 6% by means of an oxygen-nitrogen mixed gas. The mixture after warming treatment was filtered, and the clear liquid obtained was heated under reduced pressure to recover the butyl acetate by evaporation. After completion of the evaporation, the butyl acetate concentration in the polymer was 2,000 ppm. The residual Cu concentration in the polymer was 190 ppm.

In Example 6, the oxygen treatment was carried out prior to the recovery of the acetonitrile as the reaction solvent for the polymer and the unreacted 1,7-octadiene by evaporation. It is seen that when the oxygen treatment is carried out in the presence of a polar solvent following polymerization, the residual Cu concentration in the polymer obtained after the subsequent purification can be markedly reduced.

INDUSTRIAL APPLICABILITY

By carrying out the oxygen treatment in the presence of a polar solvent in accordance with the present invention, it is possible to effectively separate the polymerization catalyst from the vinyl polymer (preferably vinyl polymer produced by utilizing the technique of atom transfer radical polymerization). In particular, when the polymer with a polar solvent having a relative dielectric constant not lower than a certain specific level as added to the polymer is brought into contact with a mixed gas composed of oxygen and an inert gas such as nitrogen with an oxygen concentration not higher than the explosion limit oxygen concentration for that solvent in pure state, the transition metal complex can be separated safely and efficiently. Thus, the polymer can be obtained as a better-quality one.

The invention claimed is:

1. A process for producing a vinyl polymer
wherein a vinyl polymer at the time of completion of the polymerization is treated with oxygen in the presence of a polar solvent,
the polar solvent has a relative dielectric constant $\epsilon r$ at 20° C. of not lower than 10 and
the vinyl polymer is a (meth)acrylic polymer.

2. The process according to claim 1
wherein the polarity of the whole of volatile substances coexisting with the vinyl polymer to be submitted to oxygen treatment has a relative dielectric constant at 20° C. of not lower than 10.

3. The process according to claim 1
wherein oxygen is introduced in the form of a mixed gas composed of oxygen at a volume percent of not higher than 10% and an inert gas.

4. The process according to claim 1
wherein oxygen treatment time is not shorter than 1 hour.

5. The process according to claim 1
wherein the vinyl polymer is a halogen group-containing vinyl polymer.

6. The process according to claim 1
wherein the vinyl polymer has a number average molecular weight of 500 to 100,000.

7. The process according to claim 1
wherein the vinyl polymer has a molecular weight distribution of lower than 1.8.

8. The process according to claim 1
wherein the vinyl polymer is one produced by atom transfer radical polymerization.

9. The process according to claim 8
wherein the transition metal complex, which serves as the catalyst for the atom transfer radical polymerization, is selected from complexes of copper, nickel, ruthenium or iron.

10. The process according to claim 9
wherein the transition metal complex is a copper complex.

* * * * *